Figure 1:
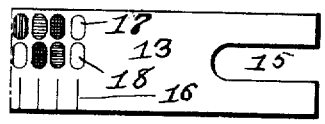
Figure 11:
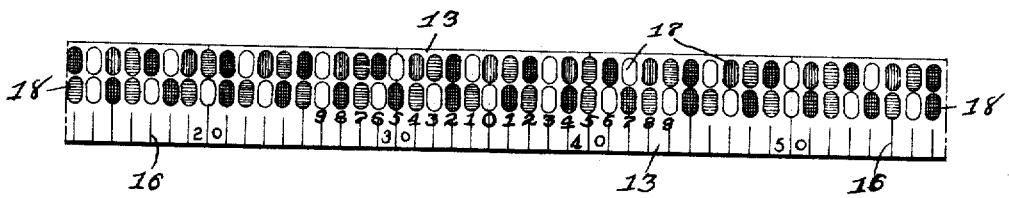
Figure 111:
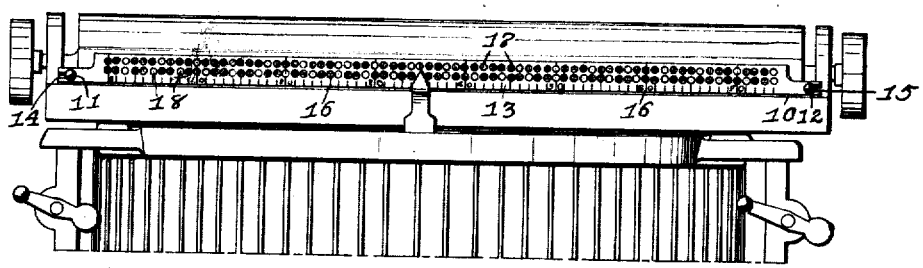

M. C. MOSHER.
TABULATING SCALE BAR.
APPLICATION FILED DEC. 9, 1907.

909,313.  Patented Jan. 12, 1909.

Witnesses.

Inventor.

UNITED STATES PATENT OFFICE.

MARY C. MOSHER, OF DES MOINES, IOWA.

TABULATING SCALE-BAR.

No. 909,313.		Specification of Letters Patent.		Patented Jan. 12, 1909.

Application filed December 9, 1907. Serial No. 405,655.

*To all whom it may concern:*

Be it known that I, MARY C. MOSHER, a citizen of the United States, residing in Des Moines, county of Polk, and State of Iowa, have invented a new and useful Improvement in Tabulating Scale-Bars, of which the following is a specification.

The object of my invention is to provide a tabulating scale bar for a typewriting machine which will be so constructed that it may be easily and quickly attached to any of the standard make of machines and which after being placed thereon will serve the dual purpose of a scale bar and tabulator.

My object is further to produce such a device in a simple, strong, durable and inexpensive construction.

My invention consists of certain details of construction hereinafter set forth, pointed out in my claim and illustrated in the accompanying drawings in which—

Figure I shows a detail view of one end of my device; Fig. II shows a front elevation of the central portion of my device; and, Fig. III shows my device complete and attached to a typewriting machine.

Referring to the accompanying drawings the reference numeral 10 is used to indicate the scale bar of a typewriting machine and 11 and 12 the securing screws at either end thereof.

The numeral 13 is used to indicate the body portion of my device and the numerals 14 and 15 indicate slots one projecting inwardly from each end of the said body portion. The distance between the inner ends of the two said slots is designed to be slightly less than the distance between the screws 11 and 12 for purposes hereinafter set forth.

The body portion of my device is designed to be scored, as shown at 16, so as to conform exactly to the generally adopted scorings of the scale bars on standard makes of typewriting machines and the said scorings are numeraled in spaces of 10 as shown. Extending horizontally the entire distance across the face of my device, and near the upper portion thereof, I have arranged one continuous line of oval shaped figures 17, each of said figures representing a graduation of the scale bar, or a space on the carriage of the machine, and each of said figures is arranged exactly over one of the said scorings. The said line of figures is further divided into consecutive groups of fours no additional space however being used to separate the said groups which are formed by the said ovals being filled with different colors, as for instance, the first oval of each set being white, the second oval green, the third oval red and the fourth oval to be of like color. Between the said line of oval figures 17 and the top of the scored graduations 16, I have provided another continuous line of oval shaped figures 18, said two lines of figures being parallel and containing the same number of oval figures and the figures in line 18 so arranged as to come exactly under its respective figure of line 17. The figures in line 18 are divided into groups of threes in exactly the same manner as the figures in line 17 are arranged in groups of fours the colors being used as the distinguishing mark for grouping and no additional spacing being used. Thus it is obvious that in the arrangement adopted in line 18 each third oval is of like color.

In securing my device to the scale bar of a machine the screws 11 and 12 are loosened and the ends of my device (preferably celluloid) slipped thereunder the slotted portions 14 and 15 providing for the shafts of the screws. The screws are then tightened and my device is secured to the scale bar. By construction my device is made to practically cover the forward surface of the scale bar and the scored graduations and oval figures are designed to be directly in line with and over the graduations of the scale bar.

The line of figures across the bar is intended for use in drawing legal papers, and the like, where fancy lines are used, with a central figure or group of figures, thus making the line of like length from the point of beginning to the central figure and from the central figure to the end. In this work the cipher represents the central figure, and the line can be begun from any point, as indicated by the figures, to the left and extended to a corresponding point as indicated by the figures to the right.

In practical operation the line of figures arranged in groups of fours is designed for tabulating columns of large amounts and the line of figures arranged in groups of threes is designed for tabulating columns of numbers, small amounts, dates, and to indicate the margins for other columns, such as names, addresses, remarks and the like.

It is obvious that figures and characters, other than the colored ovals I employ may be used and grouped to produce the same results as I have hereinbefore described but such use would in no manner change my invention, the principal feature of which is to group characters or figures for the purposes stated.

Having thus described my invention what I claim and desire to secure by Letters Patent of the United States is:—

A tabulating scale bar for writing machines composed of a bar having transverse lines scored on its face adjacent one of its longitudinal sides, a row of spaced oval-shaped figures each representing a graduation of the scale bar of the machine arranged adjacent the opposite side of said bar, a second row of spaced oval-shaped figures arranged between said scored lines and said first row of figures and alining with the figures of said row, said first named row being arranged in groups of four and said second named row being arranged in groups of three, the groups of said oval-shaped figures being differently colored.

MARY C. MOSHER.

Witnesses:
OZELL G. ROE,
BLANCHE SEDGWICK.